United States Patent
Eckhard et al.

(10) Patent No.: US 10,773,325 B2
(45) Date of Patent: Sep. 15, 2020

(54) FLUX-FREE JOINING OF ALUMINIUM COMPOSITE MATERIALS

(71) Applicants: Kathrin Eckhard, Bonn (DE); Olaf Güßgen, Langenfeld (DE); Hartmut Janssen, Hilden (DE)

(72) Inventors: Kathrin Eckhard, Bonn (DE); Olaf Güßgen, Langenfeld (DE); Hartmut Janssen, Hilden (DE)

(73) Assignee: Hydro Aluminium Rolled Products GmbH, Grevenbroich (DE)

(*) Notice: Subject to any disclaimer, the term of this patent is extended or adjusted under 35 U.S.C. 154(b) by 0 days.

(21) Appl. No.: 15/177,581

(22) Filed: Jun. 9, 2016

(65) Prior Publication Data

US 2016/0325367 A1 Nov. 10, 2016

Related U.S. Application Data

(63) Continuation of application No. PCT/EP2014/077519, filed on Dec. 12, 2014.

(30) Foreign Application Priority Data

Dec. 13, 2013 (EP) .................................... 13197108

(51) Int. Cl.
*B23K 1/20* (2006.01)
*B23K 35/22* (2006.01)
(Continued)

(52) U.S. Cl.
CPC ............ *B23K 1/0012* (2013.01); *B23K 1/012* (2013.01); *B23K 1/19* (2013.01); *B23K 1/206* (2013.01);
(Continued)

(58) Field of Classification Search
None
See application file for complete search history.

(56) References Cited

U.S. PATENT DOCUMENTS 2,719,796 A * 10/1955 Kappes .................... C23D 3/00
427/309
3,694,899 A * 10/1972 Chartet ................ B23K 35/002
228/207
(Continued)

FOREIGN PATENT DOCUMENTS

JP 49-18536 B 5/1974
JP 04100674 A 4/1992
(Continued)

OTHER PUBLICATIONS

UACJ R&D, Experimental Testimony, Nov. 21, 2018, 4 pages.

*Primary Examiner* — Devang R Patel
(74) *Attorney, Agent, or Firm* — Reinhart Boerner Van Deuren P.C.

(57) ABSTRACT

Use of an aluminium composite material in a thermal joining method, said material consisting of at least one aluminium core alloy and at least one external brazing layer consisting of an aluminium brazing alloy provided on one or both sides of the aluminium core alloy, wherein the aluminium brazing layer has a pickled surface. Reduced costs and a lower environmental impact is achieved by using an aluminium composite material in which the pickled surface of the aluminium brazing layer had been pickled by pickling with an acid, aqueous pickling solution containing at least one mineral acid and at least one complex-forming agent or a complexing mineral acid, wherein the removal of material in the pickling is between 0.05 $g/m^2$ and 6 $g/m^2$, the aluminium composite material is used in a flux-free, thermal joining method, and the joining method is carried out in the presence of a protective gas.

13 Claims, 5 Drawing Sheets

(51) Int. Cl.

| | | |
|---|---|---|
| *C22C 21/02* | (2006.01) | |
| *B23K 1/00* | (2006.01) | |
| *F28F 21/08* | (2006.01) | |
| *F28F 1/12* | (2006.01) | |
| *B32B 15/01* | (2006.01) | |
| *B23K 35/28* | (2006.01) | |
| *B23K 1/012* | (2006.01) | |
| *B23K 35/02* | (2006.01) | |
| *B23K 1/19* | (2006.01) | |
| *C23G 1/12* | (2006.01) | |
| *B23K 101/14* | (2006.01) | |
| *B23K 103/10* | (2006.01) | |

(52) U.S. Cl.
CPC ...... *B23K 35/0222* (2013.01); *B23K 35/0233* (2013.01); *B23K 35/0238* (2013.01); *B23K 35/28* (2013.01); *B23K 35/286* (2013.01); *B23K 35/288* (2013.01); *B32B 15/016* (2013.01); *C22C 21/02* (2013.01); *C23G 1/125* (2013.01); *F28F 1/126* (2013.01); *F28F 21/084* (2013.01); *F28F 21/089* (2013.01); *B23K 2101/14* (2018.08); *B23K 2103/10* (2018.08); *F28F 2275/04* (2013.01)

(56) References Cited

U.S. PATENT DOCUMENTS

| | | | | |
|---|---|---|---|---|
| 3,779,839 | A | | 12/1973 | Kaihu et al. |
| 4,397,721 | A | * | 8/1983 | Exalto ............... C25F 1/04 205/706 |
| 5,102,033 | A | * | 4/1992 | Woods ............... B23K 1/20 216/104 |
| 5,820,015 | A | * | 10/1998 | Childree ............ B23K 35/3605 228/206 |
| 6,352,789 | B1 | * | 3/2002 | Hurd ................. B23K 35/0238 148/438 |
| 6,379,818 | B1 | * | 4/2002 | Mooij ................ B23K 35/002 205/177 |
| 6,503,640 | B2 | * | 1/2003 | Wittebrood ........ B23K 1/008 205/176 |
| 6,562,148 | B1 | * | 5/2003 | Wendel ............... C23C 22/34 148/247 |
| 2002/0040742 | A1 | * | 4/2002 | Kojima ............... B05D 7/51 148/240 |
| 2013/0263749 | A1 | * | 10/2013 | Kernig ............... B41N 1/083 101/368 |

FOREIGN PATENT DOCUMENTS

| | | | |
|---|---|---|---|
| JP | 04100696 | A | 4/1992 |
| JP | 05154693 | A | 6/1993 |
| JP | 7-164139 | A | 6/1995 |
| JP | 07164139 | A * | 6/1995 |
| JP | 11285817 | A | 10/1999 |
| JP | 2015-526290 | A | 9/2015 |
| WO | WO 98/45082 | A1 | 10/1998 |
| WO | WO 2010/000666 | A1 | 1/2010 |
| WO | WO 2013/164466 | A1 | 11/2013 |

\* cited by examiner

FLUX-FREE JOINING OF ALUMINIUM COMPOSITE MATERIALS

CROSS-REFERENCE TO RELATED PATENT APPLICATIONS

This patent application is a continuation of PCT/EP2014/077519, filed Dec. 12, 2014, which claims priority to European Application No. 13197108.7, filed Dec. 13, 2013, the entire teachings and disclosure of which are incorporated herein by reference thereto.

FIELD OF THE INVENTION

The invention relates to the use of an aluminium composite material consisting of at least one aluminium core alloy and at least one external brazing layer consisting of an aluminium brazing alloy provided on one or on both sides of the aluminium core alloy, wherein the aluminium brazing layer has a pickled surface and wherein the aluminium composite material is used in a flux-free, thermal joining method and the joining method is carried out in the presence of a protective gas. The invention also relates to a method for producing a strip-shaped aluminium composite material consisting of at least one aluminium core alloy and at least one external brazing layer consisting of an aluminium brazing alloy which is provided on one or both sides of the aluminium core alloy, in which a strip-shaped aluminium composite material is produced by roll bonding or simultaneous casting followed by rolling, and the aluminium brazing layer is then pickled with an aqueous, acidic pickling solution. Finally, the invention also relates to a method for the thermal joining of structural parts consisting of an aluminium alloy, wherein the aluminium composite material comprises at least one aluminium core alloy and at least one external brazing layer consisting of an aluminium brazing alloy provided on one or both sides of the aluminium core alloy.

BACKGROUND OF THE INVENTION

Aluminium composite materials consisting of at least one aluminium core alloy and at least one aluminium brazing layer arranged on one or both sides of the aluminium core alloy are used for producing brazed constructions. Often the brazed constructions have a plurality of brazing points, as is the case for example with heat exchangers. For this purpose various brazing methods are used for brazed metal structural parts. One of the most common methods is the so-called "controlled atmosphere brazing (CAB) method", in which the aluminium structural parts are as a rule brazed using fluxes and during the brazing process are exposed to an inert gas atmosphere, for example a nitrogen atmosphere. Other thermal joining methods also use fluxes and soften the aluminium brazing material also in the presence of a protective gas. The use of corrosive or non-corrosive fluxes has disadvantages however, for example increased plant costs and technical problems concerning the interaction of residues of the flux with for example additions of coolant in a heat exchanger. Furthermore the use of fluxes is also problematic as regards the avoidance of environmental impact and from work safety aspects. Finally, in the CAB method the use of Mg-containing core alloys is problematic, since magnesium adversely affects the brazing properties under an inert gas atmosphere. In addition, the brazed structural parts can also be affected by discolourations. From international patent application WO 2010/000666 A1, a method is furthermore known for flux-free brazing with the CAB method, in which the aluminium brazing layer consists of a first aluminium brazing layer and a second aluminium brazing layer. The second aluminium brazing layer consists of an Al—Si aluminium alloy that contains in addition to 5 wt. %-20 wt. % silicon also 0.01 wt. %-3 wt. % magnesium. The first aluminium brazing alloy contains on the other hand 2 wt. %-14 wt. % silicon and less than 0.4 wt. % magnesium. The two-layer structure of the aluminium brazing layer is however unsatisfactory since the production of the two-layer aluminium brazing layer involves higher costs.

Moreover a significant disadvantage of current two-layer structures, for example with an outer-lying cladding of pure aluminium, may be that its use is not compatible with fluxes. Unsatisfactory brazing results, for example on account of a temporarily worse furnace atmosphere with too high an oxygen partial pressure or too high a moisture content in the atmosphere, cannot be compensated for example by the use of fluxes.

The second method, which is often employed, is vacuum brazing, in which the structural parts to be brazed are brazed in an atmosphere at a very low pressure, for example about $10^{-5}$ mbar or less. Vacuum brazing can be carried out without fluxes, though usually a certain amount of magnesium is added to the aluminium brazing material in order to obtain a better brazing result. The use of Mg-containing brazing material is associated with additional negative effects, for example the need for frequent furnace cleaning routines. Vacuum brazing is moreover very complicated in terms of apparatus requirements and therefore very cost-intensive. From the Japanese publications JP 04-1000696, JP 04-100674 as well as JP 05-154693, the use of an alkaline-pickled aluminium composite material in a vacuum brazing method or with fluxes in a CAB method is known.

The specification U.S. Pat. No. 5,102,033 describes on the other hand a method in which an aluminium composite material consisting of an aluminium core alloy and an aluminium brazing alloy layer is pickled with an acidic pickling solution that contains a mixture of nitric acid and hydrofluoric acid and is then brazed by vacuum brazing. Although the US specification also mentions conventional brazing methods, these are however as a rule characterised by the use of fluxes, in so far as they are not carried out in a vacuum. Also, an aluminium brazing alloy for brazing using fluxes is disclosed in WO 98/45082.

The published application WO 2013164466 A1 of the Applicant in fact discloses the principle of the use of an acid-pickled aluminium composite material in a flux-free thermal joining method. Further details are, however, not disclosed.

In U.S. Pat. No. 3,779,839A, a method is also disclosed in which aluminium structural parts are pickled in an alkaline or acid solution and are then joined by flux-free brazing.

JP H11-285817 A relates to an aluminium brazing alloy with a specified Mg, Bi and Be content that is coated with a forming oil after an acidic pickling. After removing the forming oil the alloy can then be brazed flux-free in an inert gas atmosphere.

Against this background the object of the present invention is to propose the use of an aluminium composite material with an aluminium brazing layer in a thermal joining method, which leads to a further reduction in costs and a lower environmental impact. In addition a method for producing the aluminium composite material, a method for thermal joining as well as a thermally joined construction should also be provided.

BRIEF SUMMARY OF THE INVENTION

According to a first teaching of the present invention the aforementioned object is achieved by using an aluminium composite material, in which the pickled surface of the aluminium brazing layer has been pickled with an acid, aqueous pickling solution containing:

at least one mineral acid or at least one acid of the group of short-chain carboxylic acids and at least one complex-forming agent or at least one complexing mineral acid wherein the removal of material in the pickling is between 0.05 g/m$^2$ and 6 g/m$^2$, preferably between 0.1 g/m$^2$ and 1 g/m$^2$, particularly preferably between 0.2 g/m$^2$ and 0.4 g/m$^2$, the aluminium composite material is used in a flux-free, thermal joining method, and the joining method is carried out in the presence of a protective gas.

Preferably, as mineral acids there are used for example $H_2SO_4$ in an amount of 0.1%-20 wt. %, $H_3PO_4$ in an amount of 0.1%-20 wt. %, HCl in an amount of 0.1%-10 wt. %, and also HF in an amount of 20 ppm-3% or a combination of the mineral acids. As complexing mineral acids there are preferably used HF in an amount of 20 ppm to 3 wt. %, 20 ppm to 1000 ppm or 20 ppm to 600 ppm, particularly preferably 300 ppm to 600 ppm or 300 ppm to 480 ppm as well as $H_3PO_4$ in an amount of 0.1%-20 wt. %. A particularly preferred combination consists of $H_2SO_4$ in an amount of 0.5%-2 wt. % and HF in an amount of 20 ppm and 480 ppm.

Formic acid is preferably used as short-chain carboxylic acid. As complex-forming agents, fluorides for example are used in an amount of 20 ppm to 3 wt. %, preferably 20 ppm-1000 ppm or 20 ppm-600 ppm, particularly preferably 300 ppm-600 ppm or 300 ppm-480 ppm. In the experiments it has been shown in particular that using fluorides in a concentration of at most 300 ppm-600 ppm, preferably 300 ppm-480 ppm, is sufficient in order to allow a quick surface treatment in an industrial environment.

Contrary to what was previously known, it was now found that by pickling the aluminium brazing layer using at least one mineral acid or at least one acid of the group of short-chain carboxylic acids in combination with a complex-forming agent or using complexing mineral acids, a surface consistency of the aluminium brazing layer can be obtained, so that in a thermal joining process in the presence of a protective gas this has outstanding brazing properties or properties for thermal joining without the need for fluxes. The result is surprising in so far as what is important here is the combination of removal of material in an amount between 0.05 g/m$^2$ and 6 g/m$^2$, preferably between 0.1 g/m$^2$ and 1 g/m$^2$, particularly preferably between 0.2 g/m$^2$ and 0.4 g/m$^2$, and the complex formation by the pickling solution. The mineral acid provides for the corresponding removal of material during pickling, which is necessary in order to prepare the surface for the flux-free thermal joining under a protective gas or inert gas atmosphere. It is assumed that the removal of material in conjunction with the complex-forming agent leads to a specific surface configuration of the aluminium brazing layer, which allows a subsequent brazing under a protective gas without the use of fluxes. If the removal of material is for example less than 0.05 g/m$^2$, only poor brazing results are achieved. A removal of material greater than 6 g/m$^2$ does not affect the brazing properties and leads in the production to an unnecessarily high loss of material. This can be reduced further by reducing the removal of material to 1 g/m$^2$ or 0.4 g/m$^2$. A removal of material of at least 0.05 g/m$^2$ guarantees that the brazing properties are improved so that a strip-wise processing leads to good brazing results. With a removal of material of up to 0.4 g/m$^2$ the process reliability for achieving the brazing properties is raised without unnecessarily increasing the removal of material.

These results could be achieved with an appropriately adjusted removal of material also with a complexing mineral acid by itself, such as for example HF in an amount of 20 ppm to 3 wt. % or $H_3PO_4$ in an amount of 0.1 wt. % to 20 wt. %. In this case, for HF preferably 20 ppm to 1000 ppm or 20 ppm to 600 ppm, particularly preferably 300 ppm to 600 ppm or 300 ppm to 480 ppm are used. By means of the invention it is now also possible that structural parts, which on account of high demands as regards to the cleanliness of the surface could hitherto be brazed only in a vacuum, can in the future also be joined in a flux-free, more cost-effective CAB method.

For example, the aluminium composite material can preferably be used in a flux-free CAB method. The CAB method is characterised by the fact that the heating process of the brazing partners is carried out in a controlled inert gas atmosphere, in particular largely with the exclusion of oxygen and atmospheric moisture.

The effectiveness of the employed mineral acid can, according to one embodiment, be increased further if in addition the surface of the aluminium brazing layer had been degreased before or during the pickling.

According to a further development of the use of the aluminium composite material the surface of the aluminium composite material was pickled beforehand with a mineral acid and fluorides as complex-forming agents. It was found that fluorides enable particularly good results to be achieved with regard to a flux-free brazing or thermal joining under a protective gas. This is attributed inter alia to the fact that fluorides in combination with aluminium as central atom have a very high complex formation constant and thus bring alloy constituents directly into solution.

The use of an aluminium composite material with a suitably acid pickled surface in an aluminium brazing process is further improved if for example as aluminium core alloy an aluminium alloy of the type AA1xxx, AA2xxx, AA3xxx, AA5xxx or AA6xxx is provided, in which the Mg content in the specified aluminium core alloys is in each case at most 1.0 wt. %. On account of the aluminium core alloys, in particular also Mg-containing aluminium core alloys, that can now be used in thermal joining under a protective gas, the range of the areas of use of brazed constructions has been significantly broadened. In particular, for example also Mg-containing aluminium alloys that are difficult to braze, such as for example of the alloy type AA5xxx or AA6xxx with an Mg content of at most 1.0 wt. %, can according to a further embodiment be joined in a flux-free, thermal joining method under a protective gas.

According to a further development of the invention the aluminium brazing alloy has the following compositions in wt. %:

6.5%≤Si≤15%,
Fe≤1%,
Cu≤0.3%,
Mg≤2.0%.
Mn≤0.15%,
Zn≤0.15%,
Ti≤0.30%, the remainder Al and unavoidable impurities individually at most 0.05%, totalling at most 0.15%.

As aluminium brazing alloy, there are preferably used for example the aluminium brazing alloys of the type AA4343 or AA4045 or AA4047. Common to all aluminium brazing alloys that satisfy the above-mentioned specification is that they have a lower melting point than the aluminium core alloy, so that on heating the structural part to be brazed to a temperature below the solidus temperature of the aluminium core alloy the aluminium brazing layer becomes liquid or at least partially liquid. The aluminium core alloy, however, does not melt. The Si contents of the aluminium brazing alloy are preferably between 7.5 wt. % and 13 wt. %, particularly preferably between 8.5 wt. % and 13 wt. %, or between 10 wt. % and 13 wt. %.

In order to ensure the mechanical properties of the aluminium composite material in a subsequent application, according to a further development these are solution annealed, soft annealed or re-annealed before or after the pickling.

An aluminium composite material that can be produced on an economically large scale can be provided if the aluminium composite material has been produced by simultaneous casting or roll bonding. As an alternative to simultaneous casting or roll bonding it is also possible to apply the aluminium brazing layer by thermal spraying. The first mentioned variants are, however, the methods currently used on a large industrial scale to produce an aluminium composite material, in which the cast material differs due to its significant concentration gradients between the various aluminium alloy layers from the discrete layer compositions of the roll-bonded material. In roll bonding only slight diffusion processes between the layers take place.

Preferably an aluminium composite material is used that is characterised in that at least one aluminium brazing alloy layer has a mean thickness of at least 10 μm. It has been found that with a suitable geometry of the structural part, an aluminium brazing alloy layer with a mean thickness of at least 10 μm achieves particularly reliable and good brazing results and usually provides sufficient strengths of the brazing joint. The thickness of the respective brazing layer is preferably between 5% and 25%, preferably 10% to 20%, of the overall thickness of the composite material.

In addition there exists in the surface treatment the possibility of simultaneously integrating further process steps, such as for example the application of shaping aids and thus reducing the further process steps when using the aluminium composite material.

According to a second teaching of the present invention the object identified above is achieved by a method for producing a strip-shaped aluminium composite material, in particular an aluminium composite material to be used according to the invention, characterised in that the aluminium composite material is pickled in an aqueous picking solution that contains at least one mineral acid or at least one acid of the group of short-chain carboxylic acids and at least one complex-forming agent or at least one complexing mineral acid, wherein the removal of material in the pickling is between 0.05 g/m$^2$ and 6 g/m$^2$, preferably between 0.1 g/m$^2$ and 1 g/m$^2$, particularly preferably between 0.2 g/m$^2$ and 0.4 g/m$^2$.

The aluminium composite material can for example be pickled with a pickling solution that contains at least one mineral acid from the group $H_2SO_4$, HCl, HF or $H_3PO_4$ and a complex-forming agent. As mineral acid there may be used $H_2SO_4$ in an amount of 0.1 to 20 wt. %, $H_3PO_4$ in an amount of 0.1 to 20 wt. %, HCl in an amount of 0.1% to 10 wt. % or HF in an amount of 20 ppm to 3%, preferably 20 ppm to 1000 ppm or 20 ppm to 600 ppm, particularly preferably 300 ppm to 600 ppm or 300 ppm to 480 ppm, or a combination of the aforementioned mineral acids. Alternatively, as complex-forming mineral acids there may be used HF in an amount of 20 ppm to 3%, preferably 20 ppm to 1000 ppm or 20 ppm to 600 ppm, particularly preferably 300 ppm to 600 ppm or 300 ppm to 480 ppm and also $H_3PO_4$ in an amount of 0.1% to 20 wt. %, or contains at least one acid from the group of short-chain carboxylic acids, for example formic acid, with at least one complex-forming agent. It has been found that in the process the important feature for obtaining a good brazing result is the combination of sufficient removal of material between 0.05 g/m$^2$ and 6 g/m$^2$, preferably between 0.1 g/m$^2$ and 1 g/m$^2$, particularly preferably between 0.2 g/m$^2$ and 0.4 g/m$^2$, and the complex formation by the pickling solution.

As has already been mentioned, it is specifically the combination of a mineral acid in combination with a complex-forming agent, for example a chelating compound, that is able to condition the surface of the aluminium brazing alloy layer so that during the subsequent thermal joining, a very good wettability of the brazing partner is achieved, in particular also if no flux is used and the thermal joining is carried out under a protective gas. The concentration of the mineral acid should normally produce a pH value of less than 4, preferably a pH value of 0 to 3.

Preferably the aluminium composite material is degreased with a degreasing medium during the pickling or before the pickling. In this way the effectiveness of the mineral acid in conjunction with the complex-forming agent can be increased still further.

According to a further embodiment, fluorides, citrates, oxalates or phosphates are used as complex-forming agents. The concentration of the complex-forming agents is preferably 20 ppm to 3 wt. % fluoride, preferably 20 ppm to 1000 ppm or 20 ppm to 600 ppm, particularly preferably 300 ppm to 600 ppm or 300 ppm to 480 ppm, 0.001% to 10 wt. % citrate, particularly preferably 0.5% to 5 wt. % citrate, 0.001% to 5 wt. % oxalate, and also 0.005% to 40 wt. % phosphate. In principle complex-forming terpenes can also be used. Other chelating and complex-forming compounds, for example typical agents used in complexometric titrations, can also be used in order to obtain good brazing results, but usually are not acceptable for economic and ecological reasons.

In particular, the complexing mineral acids HF has on account of the high complex formation constant of the fluoroaluminates large effects on the brazing result already at very low concentrations, as can be illustrated later, and also with short pickling treatments already leads to a good brazing result in flux-free brazing under a protective gas.

According to a further embodiment of the method the concentrations of the mineral acid in the pickling solution have the following limits:

$H_2SO_4$: 0.1% to 20 wt. %,
$H_3PO_4$: 0.1% to 20 wt. %,
HCl: 0.1% to 10 wt. %,
HF: 20 ppm to 3 wt. %, Regardless of their technical feasibility, higher concentrations are not acceptable for economic or ecological reasons. In addition, it has been found that a combination of the mineral acids $H_2SO_4$ and HF in the concentrations mentioned above provide particularly good brazing results. A particularly preferred combination consists of $H_2SO_4$ in an amount of 0.5 to 2 wt. % and HF preferably in an amount of 20 ppm to 1000 ppm or 20 ppm to 600 ppm, particularly preferably 300 ppm to 600 ppm or 300 ppm to 480 ppm.

Optionally at least one surfactant is provided in the aqueous pickling solution in order at the same time to degrease the surface of the aluminium composite material and increase the uniformity and speed of the pickling action of the pickling solution.

The aforementioned concentrations of mineral acids enable, by lowering the pH value, the surface of the aluminium brazing alloy layer to be attacked. The complex-forming agents ensure that at the aforementioned concentrations of mineral acids alloy constituents that have been dissolved out are highly water-soluble and to that extent can be removed from the reaction site. Owing to the optionally present surfactants, possible organic coatings are removed from the surface and a degreasing of the aluminium strip surface is achieved. This has the result that the pickling action cannot be inhibited locally by organic surface coatings and thus takes place with a very high uniformity.

According to a further development of the method the pickling solution additionally contains $HNO_3$. The effectiveness of HF can be increased further by the combination with nitric acid $HNO_3$ and other mineral acids, so that an improved brazing result can be achieved with a lower HF use. The concentration of $HNO_3$ is preferably 0.1 wt. % to 20 wt. %.

The residence time of the strip-shaped aluminium composite material in the pickling solution is 1 to 20 seconds, preferably 2 to 8 seconds, and an economically realisable surface treatment step can be carried out in which for example a whole aluminium strip is surface treated.

The treatment time can be reduced further if the temperature of the pickling solution is 40° C. to 85° C., since in this way the reactivity of the reagents is further increased. Temperatures above 85° C. require additional measures with no significant gain in processing speed. A preferred temperature range is therefore 50° C. to 60° C.

According to a third teaching of the present invention the object is achieved by a method for the thermal joining of structural parts of an aluminium alloy in the use according to the invention of an aluminium composite material, in which the aluminium composite material comprises at least one aluminium core alloy and at least one external brazing layer consisting of an aluminium brazing alloy provided on one or on both sides of the aluminium core alloy, wherein the aluminium brazing layer has a surface pickled with a method according to the invention, the aluminium composite material is joined in a flux-free, thermal joining method, and the joining method takes place in the presence of a protective gas. Owing to the use of a protective gas, for example nitrogen, the formation of an oxide film on the surface of the liquid brazing material is prevented, which has a significantly higher melting point and as a result the brazing process is hindered. It has been found that in the thermal joining using a protective gas in the use according to the invention of the aluminium composite materials with an acid pickled surface, in which the surface was pickled with a mixture of a mineral acid and a complex-forming agent or a complexing mineral acid, high quality brazing results are achieved also without the use of fluxes. This was not possible up to now, especially with a single-layer structure of the aluminium brazing layer.

Particularly advantageous therefore are also the thermally joined constructions produced by the method, comprising at least a first and a second thermally joined part, wherein at least one of the parts comprises an aluminium composite material with an aluminium brazing layer, wherein at least one aluminium brazing layer of the aluminium composite material has a surface pickled by a method according to the invention, and a thermal joining zone produced in the presence of a protective gas without fluxes is provided between the first part and the second part. The particular advantage of thermal joining under a protective gas without using fluxes is that after the brazing no flux residues remain on the surfaces of the structural parts. Especially in applications in which the presence of residues of the employed fluxes leads to problems, it is desirable to avoid fluxes. The need in the conventional CAB process to apply fluxes to the surfaces of the structural parts furthermore limits the geometries of the structural part since care must be taken to be ensure that all surfaces must be accessible to the flux in the fluxing station. This greatly limits the complexity of the geometries, which is no longer the case in a flux-free process. In addition the costs of the fluxes and the operating costs of the drying step after the application of the flux can generally be avoided.

Preferably according to a further development of the method for thermal joining, at least one sheet or tube produced by the use, according to the invention, of an aluminium composite material is joined in a flux-free CAB brazing method. As has already been described, the CAB brazing method is a particularly economical method, in which the brazing joint site is completely covered by protective gas before the aluminium brazing material melts. Particular advantages are obtained especially in the use of the aluminium composite material in the brazing of heat exchangers or other structural parts having a large number of brazing sites, in which it is advantageous that the wetting properties of the aluminium composite material used according to the invention significantly increases the process reliability in the flux-free production of joining welds by brazing.

BRIEF DESCRIPTION OF THE SEVERAL VIEWS OF THE DRAWING

The invention will now be described in more detail hereinafter with the aid of exemplary embodiments in conjunction with the drawings, in which.

DETAILED DESCRIPTION OF THE INVENTION

Figure 1:
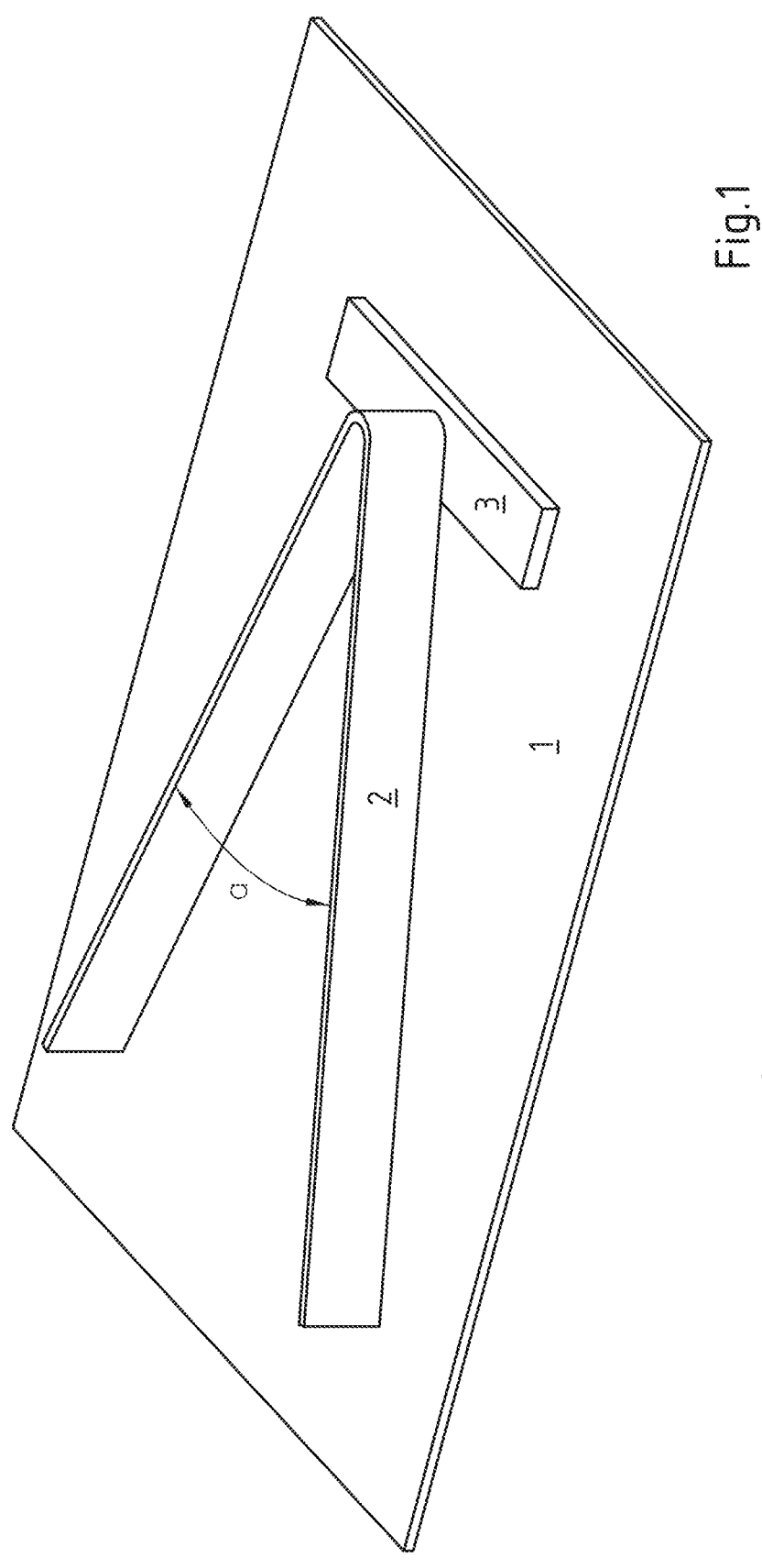
FIG. 1 is a perspective view of the brazing experimental geometry for determining the brazing abilities of the aluminium composite materials.
Figure 2:
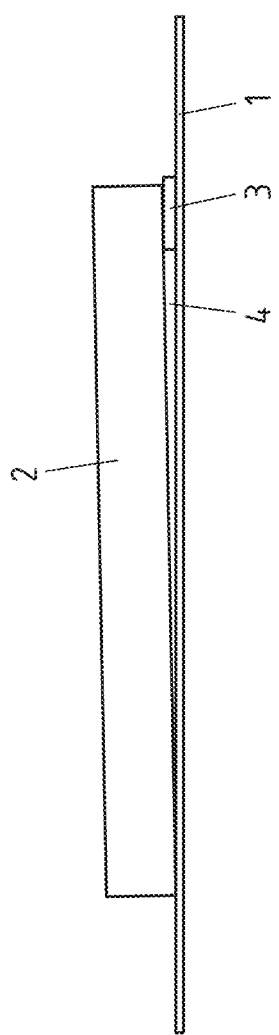
FIG. 2 is a side view of the brazing experimental geometry.

In order to investigate the advantages of the use according to the invention of the aluminium composite material, a large number of experiments were carried out with a specific brazing experimental arrangement, as illustrated in perspective view in FIG. 1. In principle the brazing experimental arrangement consists of a total of three parts, a sheet 1, an angle sheet 2 and a supporting sheet 3 for the angle sheet 2. The angle sheet 2 lies with its closed end 2a on the supporting sheet 3 arranged on the sheet 1. Both arm ends 2b on the other hand lie on the sheet 1, so that, as illustrated in the side view in FIG. 2, a varying gap is formed starting from the supporting point of the arm ends 2b of the angle sheet 3 up to the supporting point of the closed end 2a on the supporting sheet 3. The brazing joint clearance or gap 4 becomes increasingly larger starting from the angle ends 2b up to the closed end 2a of the angle sheet. Owing to the increasing brazing joint clearance 4 it is possible to evaluate to what extent the brazing properties of the aluminium composite material of the sheet 1 change under different surface treatments. In particular, in the brazing results the wetting of the prepared brazing gap was given an evaluation ranging between (1) for very good and (6) for unsatisfactory, in which connection the ability to fill the gap together with the manifestation of the brazing neck were particularly pertinent. The experiments that showed an almost complete wetting of the brazing joint clearance and a broad brazing neck were evaluated as very good (1). The experiments that led to no brazing of the structural parts were evaluated as unsatisfactory (6).

The sheet 1 consists in the present exemplary embodiment of the respective tested aluminium composite material, which comprises a roll-bonded aluminium brazing layer. The length of the arm of the angle piece 2 was in each case 50 mm, the opening angle of the angle sheet being 35°. The supporting sheet 3 has a thickness of 1 mm, so that the height difference from the closed end of the angle sheet to the arm end is 1 mm. The thickness of the angle sheet 2 was kept constant and was 0.6 mm in each case. The angle sheet 2 as well as the supporting sheet 3 are not provided with an aluminium brazing layer.

In general, the brazing ability is, apart from the use of brazable materials, also always a function of the design of the structural part, for example the geometry, gap size, etc., and also of the furnace atmosphere. Here the oxygen partial pressure and the moisture content of the atmosphere play a role. The illustrated brazing results were carried out in a batch furnace under a nitrogen flow. These brazing results were also obtained in industrial production runs using a tunnel furnace.

In the brazing experiments marked by L1, two different, roll-bonded sheets were investigated. The first sheet V has an aluminium core alloy layer of the type AA3005 as well as an aluminium brazing alloy layer of the type AA4045 plated on one side and a external aluminium alloy layer of an aluminium alloy of the type AA1050 plated on the opposite side. The overall thickness of the sheet V was 1.5 mm, the thicknesses of the plated aluminium alloy layers being on average 112 μm an for the aluminium brazing alloy layer and on average 82 μm for the opposite roll bonded aluminium alloy layer of the type AA1050.

The second investigated material R likewise consisted of a core consisting of an aluminium alloy of the type AA3005, which was roll bonded on both sides with an aluminium brazing alloy layer of the type AA4045. The overall thickness of the sheet R was 0.5 mm, so that the aluminium brazing alloy layers have on average in each case a thickness of 57 μm, about 11.5% of the overall thickness.

The sheets were then treated with the following six different pickling solutions, the duration of the treatment on account of the laboratory experimental arrangement being between 10 seconds and 300 seconds. The aqueous pickling solution composition was made as follows:

No. 1: 0.73 wt. % $H_2SO_4$, HF: 300 to 400 ppm, surfactant
No. 4: $HNO_3$ 13 wt. %, HCl: 12.5 wt. % HF: 2.2 wt. %
No. 6: $HNO_3$ 25 wt. %
No. 7: $H_3PO_4$ 10 wt. %
No. 8: Citric acid 10 wt. %
No. 9: $H_3PO_4$ 5 wt. %, citric acid: 5 wt. %.

The experiments specified in Table 1 were carried out respectively with the sheet V and the sheet R and the brazing results were evaluated corresponding to the wetted length of the brazing joint clearance 4 and the width of the brazing neck. With the brazing, the samples were heated corresponding to the experimental arrangement illustrated in FIG. 1 in a batch furnace for six minutes at a brazing temperature of 595° C. to 610° C. and brazed without flux.

Surprisingly it was found that, as can be seen from Table 2, two conditions have to be met in order to obtain a good brazing result. First of all, a certain pickling removal must be achieved, and thus it can be seen from Table 2 that the samples without or with nearly no pickling removal, L1-5 and L1-6 or L1-11 to L1-14, exhibited a very poor brazing result. However, the brazing ability cannot be predicted simply on the basis of the pickling removal; thus, the samples L1-3 and L1-4 with a shorter action time and lower pickling removal show a better brazing result compared to L1-1 and L1-2.

If, however, a combination of a mineral acid and a complex-forming agent, such as for example in No. 1, No. 4 and No. 9, is used, then a significant difference in the brazing results is found. The brazing results show in addition that, on account of the high complex formation constant of the fluoroaluminates themselves, very small amounts of HF as complex-forming agent in conjunction with a mineral acid are sufficient in order to achieve a very good brazing result in a CAB method without flux.

TABLE 1

| | | Duration (sec) | | | | |
|---|---|---|---|---|---|---|
| No. | Pickling | 10 | 30 | 60 | 120 | 300 |
| 1 | H2SO4/HF/Surfactant | | X | | X | |
| 4 | HNO3/HCl/HF | | X | | X | |
| 6 | 20-30% HNO3 | | X | | X | |
| 7 | 10% H3PO4 | | X | | X | X |
| 8 | 10% Citric acid | | X | | X | X |
| 9 | 5% H3PO4 + 5% Citric acid | | X | | X | X |

TABLE 2

| Experiment No. | Sheet | Pickling No. | Time (sec) | Pickling removal (g/m$^2$) | Brazing result |
|---|---|---|---|---|---|
| L1-1 | Inv. | V | 1 | 120 | No data | 1 |
| L1-2 | Inv. | R | 1 | 120 | 1.46 | 2 |
| L1-3 | Inv. | V | 4 | 30 | No data | 1 |
| L1-4 | Inv. | R | 4 | 30 | 0.54 | 1 |
| L1-5 | Comp. | V | 6 | 120 | No data | 6 |
| L1-6 | Comp. | R | 6 | 120 | 0.03 | 6 |
| L1-7 | Inv. | V | 7 | 120 | No data | 3 |
| L1-8 | Inv. | R | 7 | 120 | 0.90 | 3 |
| L1-9 | Inv. | V | 7 | 300 | No data | 2 |
| L1-10 | Inv. | R | 7 | 300 | 2.38 | 3 |
| L1-11 | Comp. | V | 8 | 120 | No data | 6 |
| L1-12 | Comp. | R | 8 | 120 | 0.00 | 6 |
| L1-13 | Comp. | V | 8 | 30 | No data | 6 |
| L1-14 | Comp. | R | 8 | 30 | 0.01 | 6 |
| L1-15 | Inv. | V | 9 | 120 | No data | 3 |
| L1-16 | Inv. | R | 9 | 120 | 0.64 | 2 |

TABLE 2-continued

| Experiment No. | Sheet | Pickling No. | Time (sec) | Pickling removal (g/m$^2$) | Brazing result |
|---|---|---|---|---|---|
| L1-17 | Inv. | V | 9 | 300 | No data | 1 |
| L1-18 | Inv. | R | 9 | 300 | 1.55 | 2 |

Inv. = according to invention;
Comp. = comparison

Not only HF but also $H_3PO_4$ and citric acid have complex-forming properties in relation to aluminium, which can be seen immediately from the brazing results. $H_3PO_4$ has produced good to satisfactory brazing results with the scores 2 and 3. A combination of 5% phosphoric acid with 5% citric acid with reaction times of 120 and 300 seconds already showed good brazing results. In addition, as can be seen from Table 2, it was found that the removal of material of 0.01 g/m$^2$ or 0.03 g/m$^2$ is not sufficient in order to lead to good brazing results. The experiments in which a removal of material of at least 0.05 g/m$^2$ was achieved, for example L1-4 with 0.54 g/m$^2$, show that very good brazing results can be achieved if the corresponding removal of material of at least 0.05 g/m$^2$ is established and a complex-forming agent is used.

On account of the complex-forming properties of oxalic acid in relation to aluminium it is assumed from this that a combination of oxalic acid with a mineral acid achieves equally good brazing results.

In addition it can be seen from the experimental results from Table 2 that with layer thicknesses of the aluminium brazing alloy of 51 μm and 112 μm no difference could be found as regards the brazing results. It is therefore assumed from this that, depending on the design of the structural part and quality of the furnace atmosphere, very good brazing results are achieved with brazing layer thicknesses of more than 25 μm and 30 μm.

Figure 3:
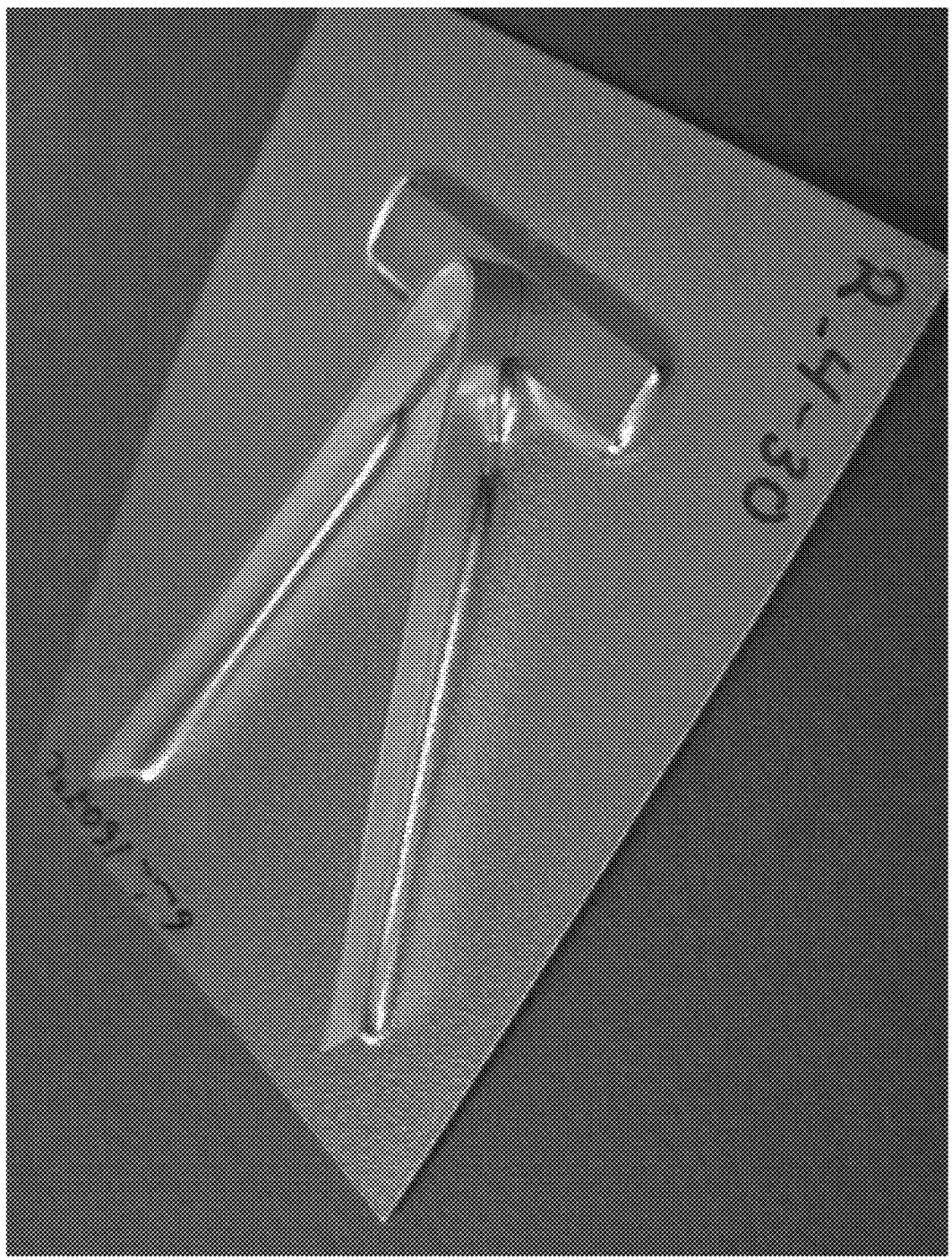
FIG. 3 is a photograph of a brazed exemplary embodiment with the use according to the invention of the aluminium composite material.

In FIG. 3, the exemplary embodiment L1-4, which was treated with the pickling solution No. 4, shows that a very good brazing result was achieved. As can be seen, almost the whole brazing joint clearance 4 between the angle sheet 2 and the angle sheet 1 had been wetted.

Figure 4B:
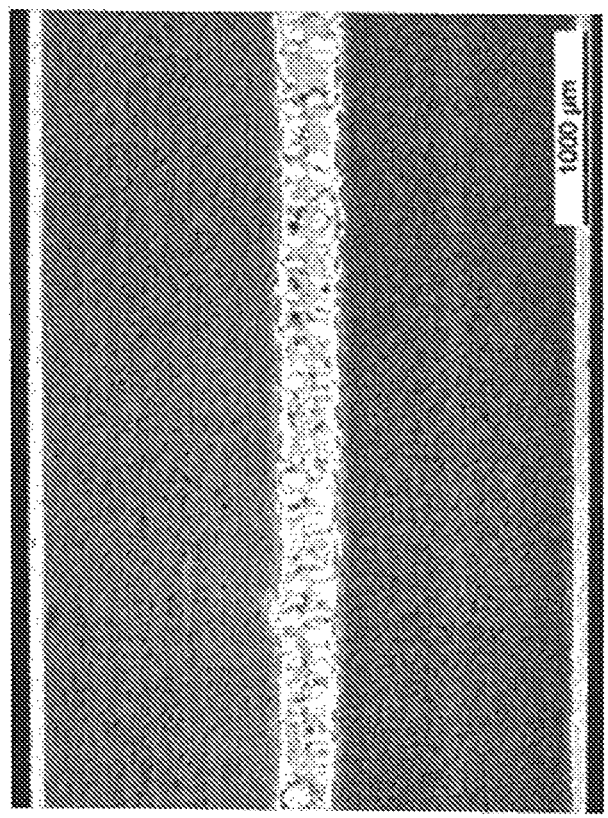
FIGS. 4A and 4B are two light microscopy transverse sections of an exemplary embodiment of a brazed construction using Mg-containing aluminium core alloys.
Figure 4A:
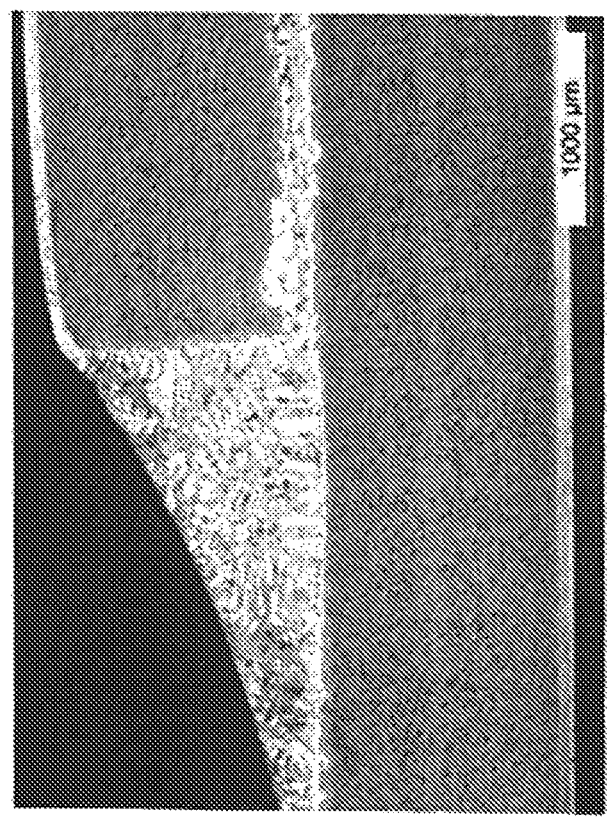

FIGS. 4A and 4B show light microscopy images of a transverse section of a further exemplary embodiment brazed flux-free in the CAB method, consisting of an aluminium core alloy material of the type AA3005 and aluminium brazing alloys of the type AA4045 provided in each case on both sides. As can be seen from FIG. 4B, in the exemplary embodiment the aluminium material was brazed with itself. In FIG. 4A it can very clearly be seen that, despite the Mg-containing core, the core alloy having an Mg content of 0.3 wt. %, there is a very clean formation of the brazed seam in the region of the overlap joint. Mg-containing aluminium core alloys could hitherto be brazed only with difficulty in a flux-free manner in the CAB method.

A similar, very good result was for example also achieved with an aluminium alloy of the type AA6063 as core alloy layer, in which a one-sided aluminium brazing alloy layer of the type AA4045 with a mean thickness of about 100 μm was applied as cladding to the core alloy layer. Also the aluminium alloys of the type AA6063 with an aluminium brazing alloy cladding showed very good brazing results if this was used with the aluminium brazing alloy layer pickled in the method according to the invention in a flux-free CAB method.

In addition further experiments were carried out, in which the picking solutions A to D were used. With these further experiments, the aim was to investigate to what extent the content of HF influenced the brazing result and whether the degree of removal by picking was an important factor.

TABLE 3

| Pickling solution | |
|---|---|
| A | 0.73 wt. % sulphuric acid + surfactant |
| B | 450 ppm fluoride + 0.73 wt. % sulphuric acid + surfactant |
| C | 1000 ppm fluoride + 0.73 wt. % sulphuric acid + surfactant |
| D | 1000 ppm fluoride |

As aluminium composite material, a sheet of the type R of thickness 0.5 mm was used, which comprised an aluminium core of a core alloy of the type AA3005 and aluminium brazing alloy layers of an aluminium alloy AA4045 applied as cladding on both sides, which have a mean thickness of ca. 57 μm, about 11.5% of the overall thickness.

On the one hand, the pickling solution A simply contained sulphuric acid and a surfactant, so that no complex-forming agents, for example HF, were present in the pickling solution. The other picking solutions B, C and D contained fluoride in each case, wherein the content was raised from 450 ppm to 1000 ppm. The pickling solution D contained only HF in an amount of 1000 ppm.

The brazing experiments arranged corresponding to the experimental arrangement in FIG. 1 were in a drum furnace The brazing results were evaluated beforehand as in the tables as unsatisfactory (6) to very good (1) on the basis of the resultant brazed seam length.

TABLE 4

| Experiment | Pickling solution | Pickling duration (sec) | 10 | 30 | 60 | 180 |
|---|---|---|---|---|---|---|
| L2-1 | A | Comp. | 6 | 6 | 6 | 6 |
| L2-2 | B | Inv. | 3 | 2 | 2 | 2 |
| L2-3 | C | Inv. | 2 | 2 | 1 | 1 |
| L2-4 | D | Inv. | 3 | 2 | 2 | 1 |

Table 4 clearly shows that the brazing experiments L2-2 to L2-4 with material according to the invention produced an excellent brazing result, in which with increasing pickling duration the result still improved from good to very good. The aluminium alloy composite materials treated only with sulphuric acid and a surfactant showed, independently of the picking duration, i.e. the removal of material by pickling, no brazing ability when brazed in a batch furnace with nitrogen flow without using fluxes and under a protective gas. The brazing temperature in the brazing experiments for 6 minutes was in the range from 595° C. to 607° C.

The difference between the use of a complex-forming agent such as HF without and with mineral acid, without sulphuric acid as in the present example, is clearly demonstrated. The combination of mineral acid and complex-forming agents in the pickling solutions B and C showed very good results, in which the results corresponding to amounts between 450 ppm and 1000 ppm differed only marginally.

Since HF acts in relation to aluminium both as an acid and at the same time as a complex-forming agent, a pickling solution D containing exclusively HF also enables very good brazing results to be achieved, though a clear dependence on the pickling duration can be seen.

In principle the amount of HF in the pickling solution should however be kept as low as possible, since handling HF in a production environment requires strict safety measures. The combination with a mineral acid thus enables the concentration of HF to be minimised, and therefore preferably 20 ppm to 1000 ppm or 20 ppm to 600 pm, particularly preferably 300 ppm to 600 ppm or 300 ppm to 480 ppm HF, are used.

In order to determine the minimal removal of material by pickling, a sheet of the type R was sprayed with a pickling solution and the contact time was varied. After measuring the removal of material, brazing experiments were carried out and the brazing results were evaluated as previously. The results are shown in Table 5. An aqueous solution containing 300 ppm fluoride and 0.73 wt. % sulphuric acid was used as pickling solution.

TABLE 5

| | Contact time (sec) | Removal of material (g/m$^2$) | Brazing result |
|---|---|---|---|
| Comp. | 0 | 0 | 6 |
| Inv. | 1.5 | 0.05 | 3 |
| Inv. | 3 | 0.10 | 3 |
| Inv. | 6 | 0.17 | 2 |
| Inv. | 9 | 0.24 | 2 |
| Inv. | 12 | 0.31 | 1 |
| Inv. | 15 | 0.38 | 1 |
| Inv. | 18 | 0.47 | 1 |

It can be seen that below 0.05 g/m$^2$ removal of material, the brazing results are obviously significantly worse. The best brazing results were observed starting with a removal of material of ca. 0.3 g/m$^2$.

Figure 5:
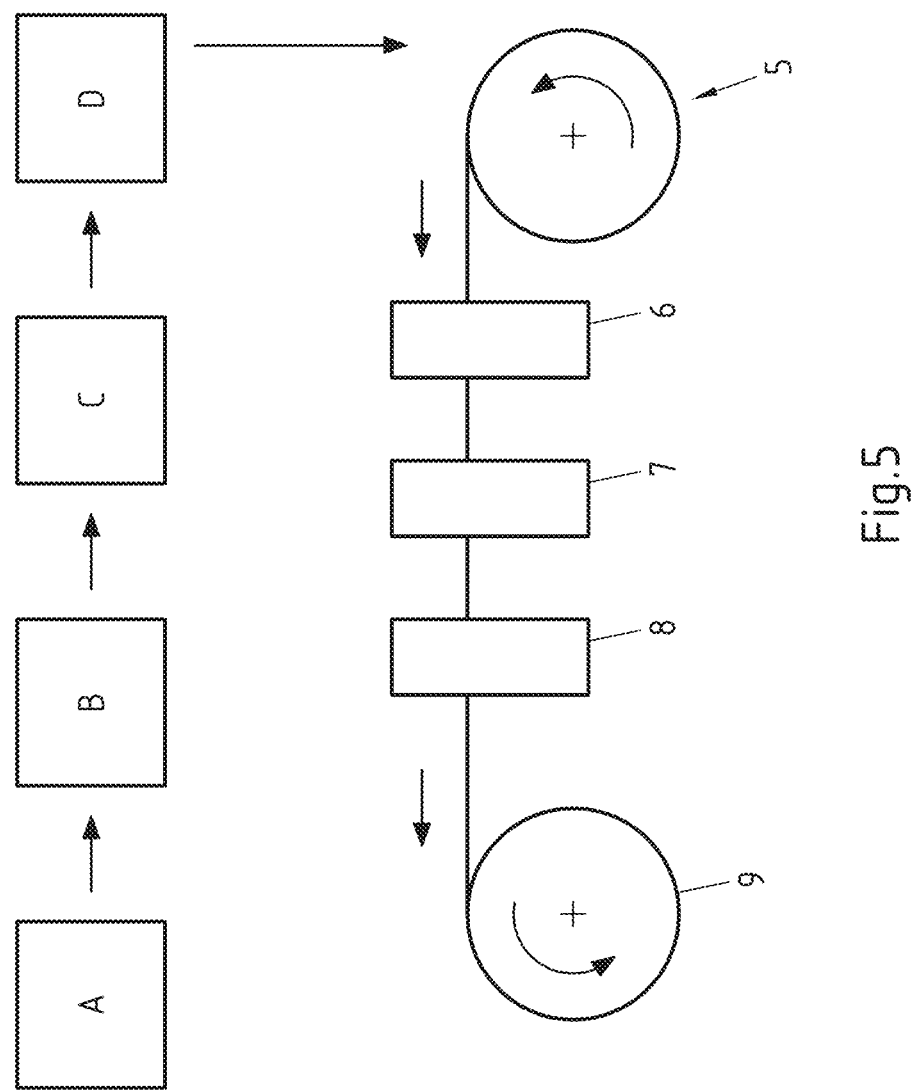
FIG. 5 is a schematic sectional view of an exemplary embodiment of a method for the production of a strip-shaped aluminium composite material.

FIG. 5 shows an exemplary embodiment of a method for producing a strip-shaped aluminium composite material. In the production step A the aluminium composite material is produced by simultaneous casting of different melts or by roll bonding. Then a cold rolling B to the end thickness can for example be carried out, in which during the cold rolling at least one intermediate annealing can be performed. Subsequently, the aluminium composite material is for example soft annealed in the process step C. In the process step D at least the aluminium brazing alloy layer undergoes a surface treatment. The process step D is then illustrated for a strip-shaped aluminium composite material.

The aluminium composite material wound on a coil 5 optionally undergoes a degreasing step 6. Subsequently, the aluminium composite material passes through the pickling step 7 in which the material is for example passed through a bath containing an aqueous, acid pickling solution, which contains apart from a mineral acid also a complex-forming agent, so that removal of material on the aluminium brazing alloy surface takes place. Preferably the bath consists of an aqueous sulphuric acid solution of 10% to 40% concentration, optionally at least one surfactant and a HF content of 20 ppm to 600 ppm, preferably 300 ppm to 600 ppm or 300 ppm to 480 ppm.

After a rinsing and drying step 8, the surface-treated aluminium composite material is wound on a coil 9. The described surface treatment step D can however also be carried out on non-strip material or directly at the outlet of the production process, i.e. at the outlet of the cold rolling or for example the soft annealing, as long as a continuous furnace is used.

Figure 6:
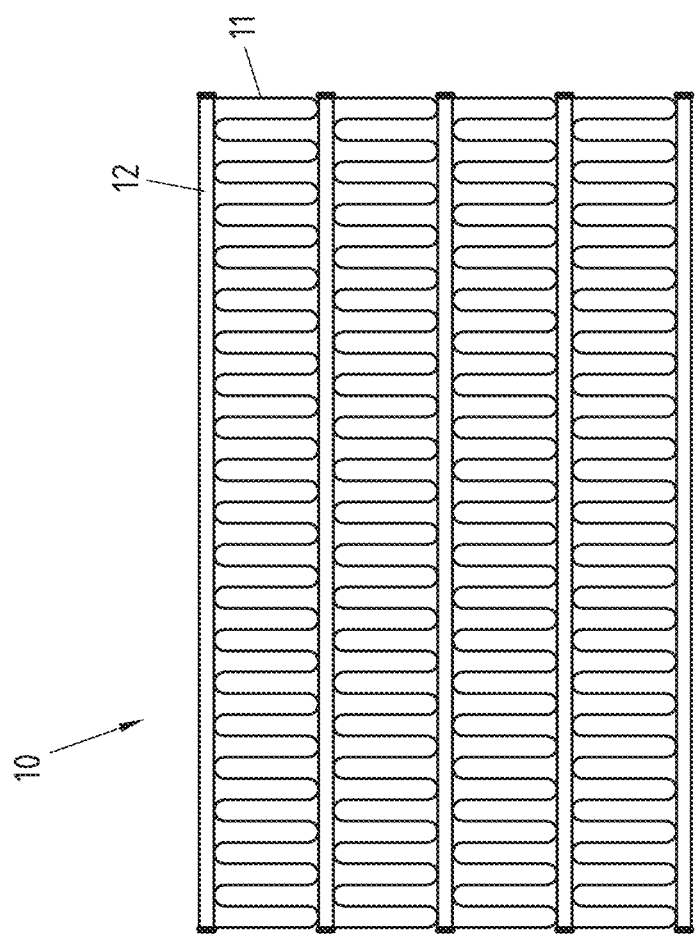
FIG. 6 is a sectional view of an exemplary embodiment of a brazed construction according to the invention in the form of a heat exchanger.

FIG. 6 shows in plan view an exemplary embodiment of a construction thermally joined according to the invention in the form of a heat exchanger 10.

The fins 11 of the exchanger 10 normally consist of blank aluminium alloy strip or aluminium alloy strip coated on both sides with an aluminium brazing material. The fins 11 are brazed bent in a meander pattern onto tubes 12, so that a large number of brazing joints is required. It is therefore particularly advantageous to use the aluminium composite material according to the invention since the particularly good brazing results in the CAB method can also be achieved without using fluxes. The absence of flux residues have, compared to heat exchangers brazed with fluxes, a positive effect on the operation of the heat exchangers.

The experimental results showed in particular that the use of an aluminium composite material that has an acid pickled surface of an aluminium brazing alloy layer, in which the pickling was performed with a combination of a mineral acid and a complex-forming agent, provides very good properties in relation to its brazing ability in a flux-free thermal joining method carried out under a protective gas, for example a CAB brazing method.

The invention claimed is:

1. A method, comprising the step of:
   utilizing an aluminium composite material in a thermal joining method, wherein the aluminium composite material is manufactured from a strip-shaped aluminium composite material consisting of at least one aluminium core alloy and at least one external brazing layer consisting of an aluminium brazing alloy provided on one or both sides of the aluminium core alloy, which is produced by roll bonding or simultaneous casting followed by rolling, wherein the aluminium brazing layer has an acid pickled surface, wherein the pickled surface of the aluminium brazing layer has been pickled with an acid aqueous pickling solution containing:
   $H_2SO_4$: 0.1% to 20 wt. %,
   HF: 20 ppm to 1000 ppm, and
   at least one surfactant,
   wherein the removal of material in the pickling is between 0.05 g/m$^2$ and 6 g/m$^2$, wherein the aluminium composite material is used in a flux-free, thermal joining method and the thermal joining method is carried out in the presence of a protective gas.

2. The method according to claim 1, wherein the aluminium composite material is used in a flux-free CAB brazing method.

3. The method according to claim 1, wherein the surface was pickled with a mineral acid and fluorides as complex-forming agent.

4. The method according to claim 1, wherein the aluminium core alloy is an aluminium alloy of the type AA1xxx, AA2xxx, AA3xxx, AA5xxx or AA6xxx, wherein the Mg content in the specified aluminium core alloys is in each case at most 1.0 wt. %.

5. The method according to claim 1, wherein the aluminium brazing alloy has the following composition in wt. %:
   6.5%≤Si≤15%,
   Fe≤1%,
   Cu≤0.3%,
   Mg≤2.0%,
   Mn≤0.15%,
   Zn≤0.15%,
   Ti≤0.30%,
   the remainder Al and unavoidable impurities individually in an amount of at most 0.05%, totaling at most 0.15%.

6. The method according to claim 1, wherein the aluminium composite material was soft annealed or re-annealed or solution annealed before the pickling.

7. The method according to claim 1, wherein at least one aluminium brazing alloy layer has a mean thickness of at least 10 µm.

8. A method for producing a strip-shaped aluminium composite material consisting of at least one aluminium core alloy and at least one external brazing layer consisting of an aluminium brazing alloy provided on one or both sides of the aluminium core alloy, in which a strip-shaped aluminium composite material is produced by roll bonding or simultaneous casting followed by rolling, and the aluminium brazing layer of the strip-shaped aluminium composite material is then pickled with an acid pickling solution, wherein the aluminium composite material is pickled with an aqueous pickling solution that contains 0.1% to 20 wt. % of $H_2SO_4$, 20 ppm to 1000 ppm of HF, and at least one surfactant, wherein the removal of material in the pickling is between 0.05 g/m² and 6 g/m².

9. The method according to claim 8, wherein the residence time of the strip-shaped aluminium composite material in the pickling solution is 1 to 20 sec.

10. The method according to claim 8, wherein the temperature of the pickling solution is 40° C. to 80° C.

11. The method according to claim 8, wherein the residence time of the strip-shaped aluminium composite material aluminium composite material in the pickling solution is 2 to 8 sec.

12. The method of claim 8, wherein the aluminium core alloy is an aluminium alloy of the type AA1xxx, AA2xxx, AA3xxx, AA5xxx or AA6xxx, wherein the Mg content in the specified aluminium core alloys is in each case at most 1.0 wt. %.

13. The method of claim 8, wherein the aluminium brazing alloy has the following composition in wt. %:
6.5%≤Si≤15%,
Fe≤1%,
Cu≤0.3%,
Mg≤2.0%,
Mn≤0.15%,
Zn≤0.15%,
Ti≤0.30%,
the remainder Al and unavoidable impurities individually in an amount of at most 0.05%, totalling at most 0.15%.

* * * * *